J. McDONALD.
TRANSMISSION LOCK.
APPLICATION FILED SEPT. 1, 1915.
1,169,660.
Patented Jan. 25, 1916.
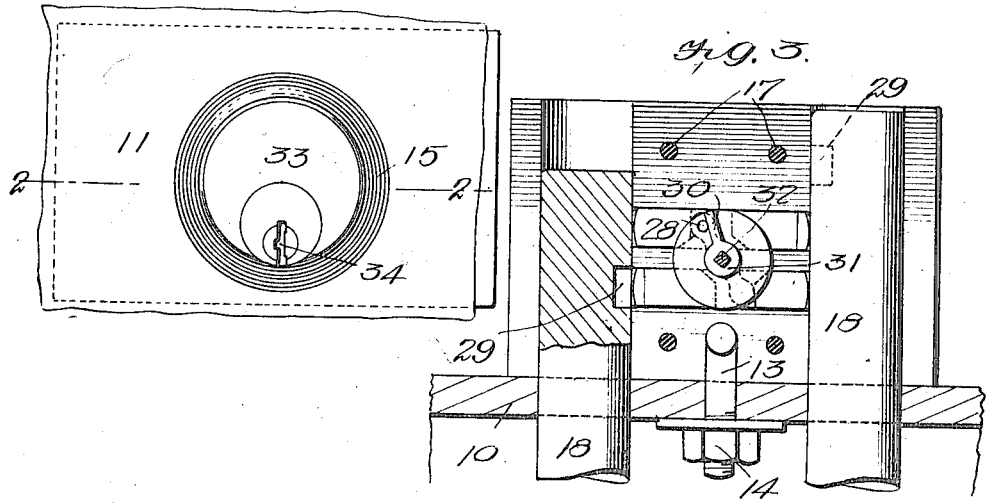
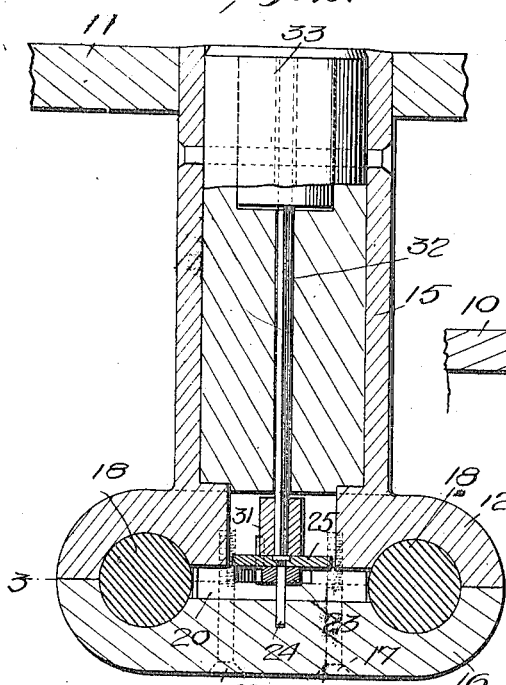
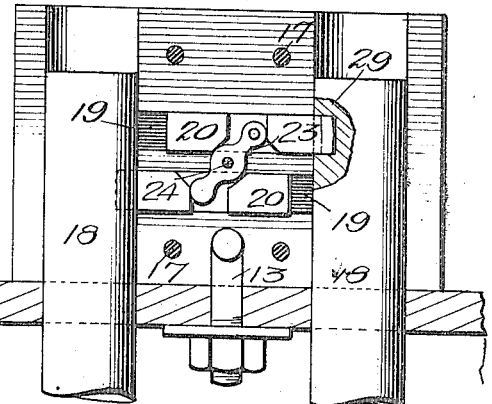
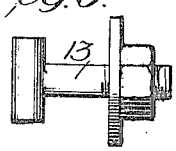
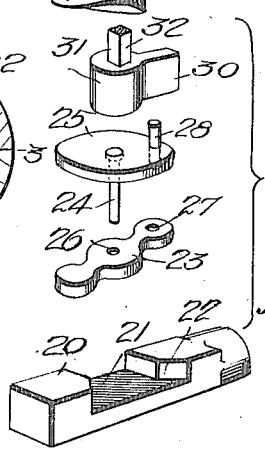
WITNESSES:
J. C. Barry
H. E. Beck
INVENTOR
James McDonald
BY Munn & Co.
ATTORNEYS

UNITED STATES PATENT OFFICE.

JAMES McDONALD, OF DALLAS, TEXAS, ASSIGNOR OF ONE-HALF TO MATTHEW C. CAMERON, OF DALLAS, TEXAS.

TRANSMISSION-LOCK.

1,169,660.  Specification of Letters Patent.  Patented Jan. 25, 1916.

Application filed September 1, 1915. Serial No. 48,453.

*To all whom it may concern:*

Be it known that I, JAMES McDONALD, a citizen of the United States, and a resident of Dallas, in the county of Dallas and State of Texas, have invented an Improvement in Transmission-Locks, of which the following is a specification.

This invention is an improvement in locks and has particular reference to a mechanism for locking the transmission of automobiles, motor cycles, motor boats, and the like.

An object of the invention is to provide a lock casing attached to the transmission casing and having the gear shifting rods extending therethrough and adapted to be locked by a novel mechanism including a sliding bolt for each rod.

Another object of the invention is to so construct and situate the lock that it will be practically impossible for any unscrupulous person to force the lock open whereby to operate the transmission gearing.

A further object is to provide a lock of this character which is simple in construction, easily manufactured, durable, and effective in carrying out the purpose for which it is designed.

The inventive idea involved is capable of receiving a variety of mechanical expressions, one of which, for the purpose of illustrating the invention, is shown in the accompanying drawing, in which—

Figure 1 is a top plan view of the lock.
Fig. 2 is a section on the line 2—2 of Fig. 1. Fig. 3 is a section on the line 3—3 of Fig. 2, showing one of the gear shifting rods in neutral position and the other rod in gearing position. Fig. 4 is a view similar to Fig. 3, with certain parts removed, the rods both being shown in neutral position and locked. Fig. 5 shows detail perspective views of details of the invention. Fig. 6 shows a preferred form of device for securing the locking casing to the transmission casing.

Referring to the drawings, the numerals 10 and 11 indicate, respectively, portions of the transmission casing and the flooring of an automobile or the like. The mechanism which comprises the essential feature of this invention may be attached to the transmission casing or may be made a part of the transmission at a slightly increased expense.
As shown in the drawing, the sectional lock casing 12 is secured to the transmission casing 10 by means of a T-bolt 13 embedded at its inner end in the lock casing and secured to the transmission casing by means of the nut 14. As many of these T-bolts may be used as are required to fasten the two casings securely together. The lock casing 12 is made in sections, one of which includes a cylindrical portion 15 while the other portion 16 is secured to the main portion of the casing by means of a plurality of screws 17 having their heads countersunk in the portion 16 as shown in Fig. 2. The lower portion of the casing 12 and the section 16 thereof have passing therethrough the relatively movable gear shifting rods 18 which are adapted to be adjusted to throw the transmission gearing in and out of mesh in the ordinary manner.

The lower portion of the lock casing 12 is provided between the rods 18 with transversely extending grooves 19 adapted to receive the locking bolts 20 movable in opposite directions relative to each other. Each of the bolts or locking members 20 is provided intermediate the ends thereof with a transverse recess 21 having adjacent ends thereof cut away as indicated at 22. An oscillating lever 23 is pivotally mounted between the two locking members 20 and has its ends extending into the recesses 21 of the bolts 20. This lever 23 is pivoted by means of a pivot pin 24 carried by a disk 25, said pin extending through an opening 26 medial the ends of the lever 23 and projecting into the lock casing 12. The lever 23 is also provided in one end with an opening 27 adapted to receive therein the portion of a pin 28 which is formed on the same side of the disk 25 as the pivot pin 24. It will thus be seen that when the disk 25 is rotated in a manner to be presently described the lever 23 will be oscillated and simultaneously move the locking bolts 20 in opposite directions whereby to engage openings 29 formed in the rods 18, as shown in Fig. 4.

In order to rotate the disk 25 a portion of the pin 28 extending from said disk in an opposite direction to the pivot pin 24 is adapted to be engaged by an extension 30 formed on the circular enlarged portion 31 provided at one end of a shaft 32, said shaft extending longitudinally of the cylindrical portion 15 of the lock casing 12 and connected at its upper end to a suitable key lock 33 of any preferred construction, said lock projecting up through the flooring 11 and having a key opening 34 into which a key is inserted.

In practice, when the transmission gearing is in use the locking bolts 20 are made to assume the position shown in Fig. 3 and this is done by rotating the shaft 32 in a counter-clockwise direction thus causing the extension 30 to engage the pin 28 as shown in Fig. 3. When the bolts 20 are in this position the rods 18 are free to be shifted for operating the transmission gearing and cannot be locked again until they are in the position shown in Fig. 4 when the openings 29 therein will register with the respective grooves 19. To lock the rods against further adjustment the extension 30 is rotated in a clockwise direction until the same engages the pin 28 on the side opposite that shown in Fig. 3. Further rotation of this extension will oscillate the lever 23 and move the same to the position shown in Fig. 4, the ends of said lever engaging the sides of the recesses 21 in the bolts 20. When the lock is used in connection with a motor cycle, the same is attached to the transmission and connected to the gear shifting rod therein so that the locking bolts 20 may be turned into and out of locking engagement with said rod.

I claim:—

1. In a transmission lock, the combination with gear shifting rods, of a sectional casing having depressions in the opposed faces of the sections for receiving said rods, one of said sections being provided with slots extending transversely to said rods, locking bolts slidable in said grooves for engagement with said rods for locking the same, means for operating said bolts, the other section of said casing having a lateral extension, and means mounted in said extension for operating the last-named means.

2. In a transmission lock, the combination with gear shifting rods; of a lock casing in which said rods are mounted in parallel relation, a locking bolt for each of said rods, said bolts being adapted for simultaneous operation in opposite directions, an oscillating lever operated to actuate said bolts, a rotary disk having a pin engaging said lever, and key operating means for rotating said disk to oscillate said lever.

3. In a transmission lock, the combination with gear shifting rods; of a lock casing in which said rods are mounted in parallel relation, a locking bolt for each of said rods, said bolts being adapted for simultaneous operation in opposite directions, an oscillating lever operated to actuate said bolts, a rotary disk having a pin engaging said lever, and a key operated shaft mounted in said lock casing and provided with an extension adapted to rotate said disk to oscillate said lever.

JAMES McDONALD.

Witnesses:
W. COOK,
O. E. SULLIVAN.